United States Patent [19]

Swensson et al.

[11] Patent Number: 5,322,405
[45] Date of Patent: Jun. 21, 1994

[54] DUST CONTROL SYSTEM

[75] Inventors: Kennet Swensson, Orkelljumga, Sweden; Clarence H. Perbix, Rolling Hills Estates, Calif.

[73] Assignees: Pacific Coast Cement Corporation, Long Beach, Calif.; Consilium CMH, Bjuv, Sweden

[21] Appl. No.: 784,900

[22] Filed: Oct. 30, 1991

[51] Int. Cl.⁵ .............................................. B63B 19/14
[52] U.S. Cl. ............................ 414/137.4; 414/137.1; 414/140.7; 114/201 R
[58] Field of Search ............... 414/137.4, 140.7, 140.9, 414/291, 137.1; 114/201 R

[56] References Cited

U.S. PATENT DOCUMENTS

| | | | |
|---|---|---|---|
| 3,348,705 | 10/1957 | Yanow | 414/137.4 |
| 3,405,814 | 10/1968 | Yanow | 414/137.4 |
| 3,785,322 | 1/1974 | Kersteter | 114/201 R |
| 4,630,561 | 12/1986 | Franz et al. | 114/201 R |
| 4,658,948 | 4/1987 | Miller | 414/140.9 |
| 4,714,097 | 12/1987 | Binzen et al. | 414/291 |
| 4,990,045 | 2/1991 | Aralt | 114/201 R |

FOREIGN PATENT DOCUMENTS

| | | | |
|---|---|---|---|
| 559521 | 7/1958 | Canada | 114/201 R |
| 291052 | 6/1991 | Fed. Rep. of Germany | 114/201 R |
| 291054 | 6/1991 | Fed. Rep. of Germany | 114/201 R |
| 57-7781 | 1/1982 | Japan | 114/201 R |
| 485904 | 11/1973 | U.S.S.R. | |
| 437650 | 1/1975 | U.S.S.R. | 114/201 R |
| 672097 | 7/1979 | U.S.S.R. | 114/201 R |

OTHER PUBLICATIONS

Translation of Artemev, Soviet patent document 672097, previously cited in Russian.

*Primary Examiner*—Michael S. Huppert
*Assistant Examiner*—Gregory A. Morse
*Attorney, Agent, or Firm*—Fulwider Patton Lee & Utecht

[57] ABSTRACT

A dust control system to prevent the escape of dust from a cargo hold during bulk materials cargo handling operations wherein a plurality of rigid frames are suspended in parallel configuration across the hold. Unloading equipment is inserted through the frames and the frames are freely traversable between opposite sides of the hold while tarpaulins disposed on either side of the frames expand or accordion as the frames' positions are shifted in order maintain coverage from side to side. Fixed tarps cover the rest of the hold. Curtains extending downwardly from the frames and from those tarpaulins affixed to the frames engage the fixed tarps in an abutting relation to form a seal.

9 Claims, 3 Drawing Sheets

DUST CONTROL SYSTEM

BACKGROUND OF THE INVENTION

1. Field of the Invention

The present invention relates generally to a system for controlling the emission of dust generated during the loading and unloading of an open-faced cargo hold. More particularly, the invention pertains to a hatch covering that prevents the escape of dust from therebelow while permitting ready access to the cargo by cargo handling equipment.

2. Description of the Prior Art

Due to increasing concern regarding the pollution of the environment, increasingly stringent restrictions are being imposed on various industries in an effort to reduce the amount of dust released into the atmosphere. While simply placing a covering over a source of dust would theoretically eliminate a dust problem, substantial practical impediments are encountered when dealing with large areas and when the area below the cover must be freely accessible.

Such problems are especially pronounced in the loading and unloading operation of bulk cargo as for example the handling of a cargo of cement in the hold of a freighter or barge. An opened cargo hold exposes an expansive area, loading and unloading equipment must be able to reach the far corners of the hold's interior without hinderance, while the handling of cement generates huge amounts of fine dust.

The unloading of bulk material such as cement is typically achieved with a device such as is described in Johansson, et al., U.S. Pat. No. 4,793,467. The device generally consists of a vertical screw conveyor housed within an elongated tubular structure that is inserted into the bulk material in order to draw the material upwardly and on to a horizontal conveyor. The intake end of the device must make direct contact with the bulk material and consequently, in order to be able to reach the peripheries of a typical hold configuration through a hatch opening of relatively reduced dimensions, the screw conveyor is manipulatable through a wide range of angles and depths. While a bulk materials loading device does not need the full freedom of movement required of an unloading device, sufficient mobility must nonetheless be available in order to achieve an even distribution within the hold. A substantial amount of dust is raised during the operation of such devices.

Hatch covers that prevent the raised dust from escaping to the atmosphere, must be able to accommodate the shifting and angling of the loading and unloading equipment. Cover systems that have been developed in the past suffer from substantial shortcomings in this respect. The system described in Swedish Patent No. 8900438-6 consists of a tarpaulin-type covering having an array of access apertures therein. Each aperture has its own removable tarpaulin type cover. Whenever the cargo handling equipment must be relocated from one aperture to another, a cover must be removed manually, the conveyor withdrawn from the hold and reinserted via the newly opened aperture while the previously used aperture must be manually covered and its cover secured. A fairly labor intensive effort is thereover required in order to take advantage of this system.

Alternatively, applicants have previously considered a substantially more complex system in which a first rigid frame is suspended across an open hold so as to enable its position to be longitudinally shifted along the hold. A second smaller rigid frame cooperates with the first frame so as to allow its position to be shifted laterally relatively thereto. By coordinating the movements of the two frames, complete access to the hold below can be achieved. Two sections of tarpaulin type material are suspended across the hold fore and aft of the first frame so as to provide coverage. Each section is of sufficient area to provide adequate coverage on one side of the frame regardless of the actual position of the first frame. The tarpaulin is suspended in a manner so as to allow excess material to accordion as the first frame is shifted towards the for or aft side of the hold. A similar tarpaulin configuration is provided on either side of the second frame within the first frame.

Although such a system theoretically provides good access to the hold while preventing the escape of dust, the system suffers from substantial shortcomings. Hatch dimensions do not conform to a universal standard, and it may be difficult if not impossible to adapt the described dual rigid frame system to undersized or oversized hatch configurations. The mechanical complexity inherent in such a system, wherein a plurality of wheeled suspension systems acting in concert with one another and wherein large number of fittings are necessary in order to attach the various tarpaulins so as to enable an accordioning action thereof when called for renders such a system prone to failure. Moreover, should a failure occur that results in either a restriction of movement of the frames or an excessive escape of dust, the entire loading or unloading operation must cease until a repair is completed.

A dust control system is therefore called for that is adaptable to a wide variety of hatch configurations; once installed, requires only a minimal amount of manual manipulation during the cargo handling operation; is not easily damaged, although if damaged, allows cargo handling operations to continue while repairs are being performed; and, is relatively inexpensive to manufacture.

SUMMARY OF THE INVENTION

The present invention overcomes the shortcomings of the prior art by providing a dust control system in the form of a hatch cover system that is easily adapted to a wide variety of hatch configurations and dimensions, provides complete access to the cargo in the hold below while requiring only a minimal amount of manual manipulation during operation, is of sufficiently simple design to reduce the likelihood of damage or failure and furthermore, has a sufficient amount of redundancy built thereinto so as to enable the continuation of cargo handling operations in the event the hatch cover system does incur some damage and while the repair of such damage is undertaken. The dust control system of the present invention provides a plurality of rigid frames through which cargo handling equipment gains access to the interior of the hold. Each frame is suspended over the hold such that the position of the frame is independently moveable between opposite sides of the hold. The frames are arranged such that their range of movement describes a series of substantially equally spaced parallel bands across the hold. The bands are spaced such that unloading equipment angled through the frames has access to the entire hold.

Each frame has its own accordioning tarpaulin sections between it and the hold's sides while additional fixed tarpaulins are fitted over the rest of the hold.

Curtain sections extending downwardly from the edges of the accordioning tarpaulins and the moveable frames cooperate with the fixed tarps to provide an effective seal. Blowers may be used to reduce the pressure within the hold to slightly below ambient to further assist in preventing the escape of dust.

The position of each frame is easily shifted from side to side by the movement of the unloading equipment inserted therethrough as it is brought into contact with the frame. When it becomes necessary to relocate the cargo handling equipment, the cover over another frame is manually removed, the cargo handling equipment is reinserted therethrough and a cover is emplaced over the previously used frame. In the event the suspension mechanism or accordioning tarps associated with a particular frame are damaged, the cargo handling equipment is simply relocated to another frame while repairs are undertaken.

Other features and advantages of the present invention will become apparent from the following detailed description taken in conjunction with the accompanying drawings, which illustrate by way of example the principles of the invention.

DETAILED DESCRIPTION OF THE PREFERRED EMBODIMENT

The figures general illustrate the dust control system according to the present invention. The system serves to cover an open cargo hold of a freighter during the loading or unloading of a bulk cargo such as cement. The system prevents the escape of dust while availing full access by the cargo handling equipment to the interior of the hold.

Figure 1:
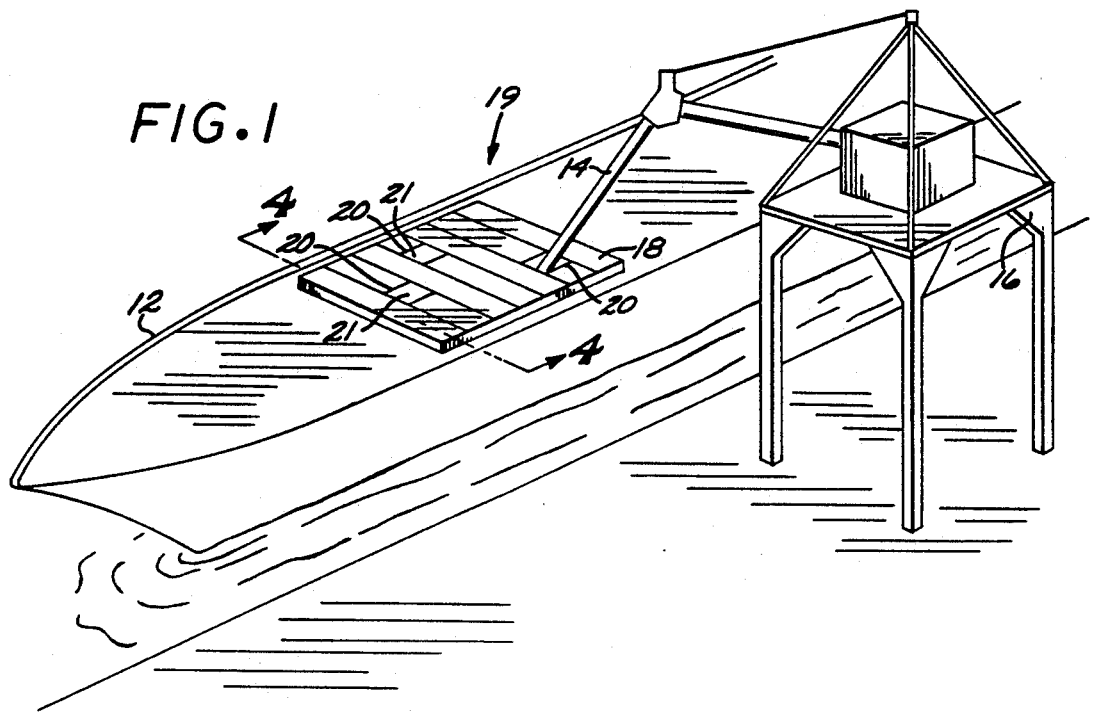
FIG. 1 is a perspective view illustrating the dust control system of the present invention in place over the hold of a freighter.

FIG. 1 is a perspective view of a freighter 12 at dockside during the unloading of its bulk cargo. The vertical conveyor component 14 of bulk materials unloading apparatus 16 is inserted into the ship's hold 18 to draw out its contents. The dust control system 19 of the present invention is fitted over open hold 18. In the embodiment illustrated, three separate and independently moveable frames 20 are suspended above hold 18. The two forward frames have covers 21 fitted thereover while the aft frame is open to accommodate the insertion of the unloading apparatus therethrough.

Figure 2:
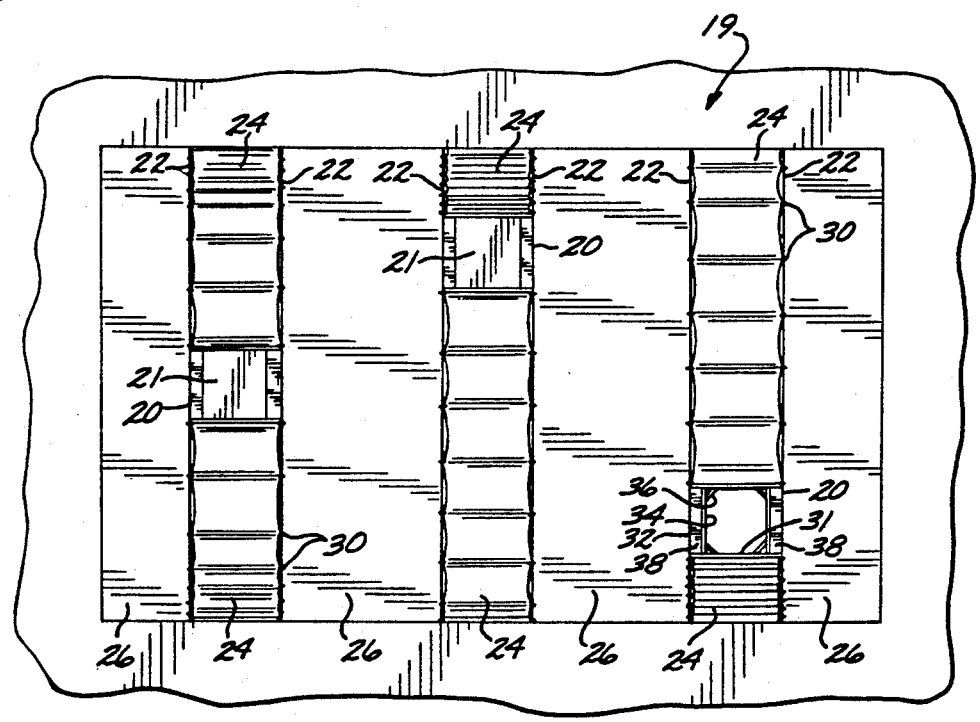
FIG. 2 is an enlarged top plan view of the dust control system shown in FIG. 1.

As more clearly illustrated in FIG. 2, each frame 20 is suspended on a pair of cables 22 along which the frame is freely moveable between the sides of hold 18. Between each pair of cables 22, and on either side of each frame 20 is disposed a section of tarpaulin 24. Each tarp 24 is affixed to the side of hold 18 and the frame 20 while fittings 30 serve to slideably attach it to cables 22 and allow the material to expand and accordion as frame 20 is moved from side to side. Additional sections of tarpaulin 26 are rigidly affixed between the sides of hold 18, both between adjacent frames as well as between the for and aft side of the hold and the adjacent cable 22.

Figure 3:
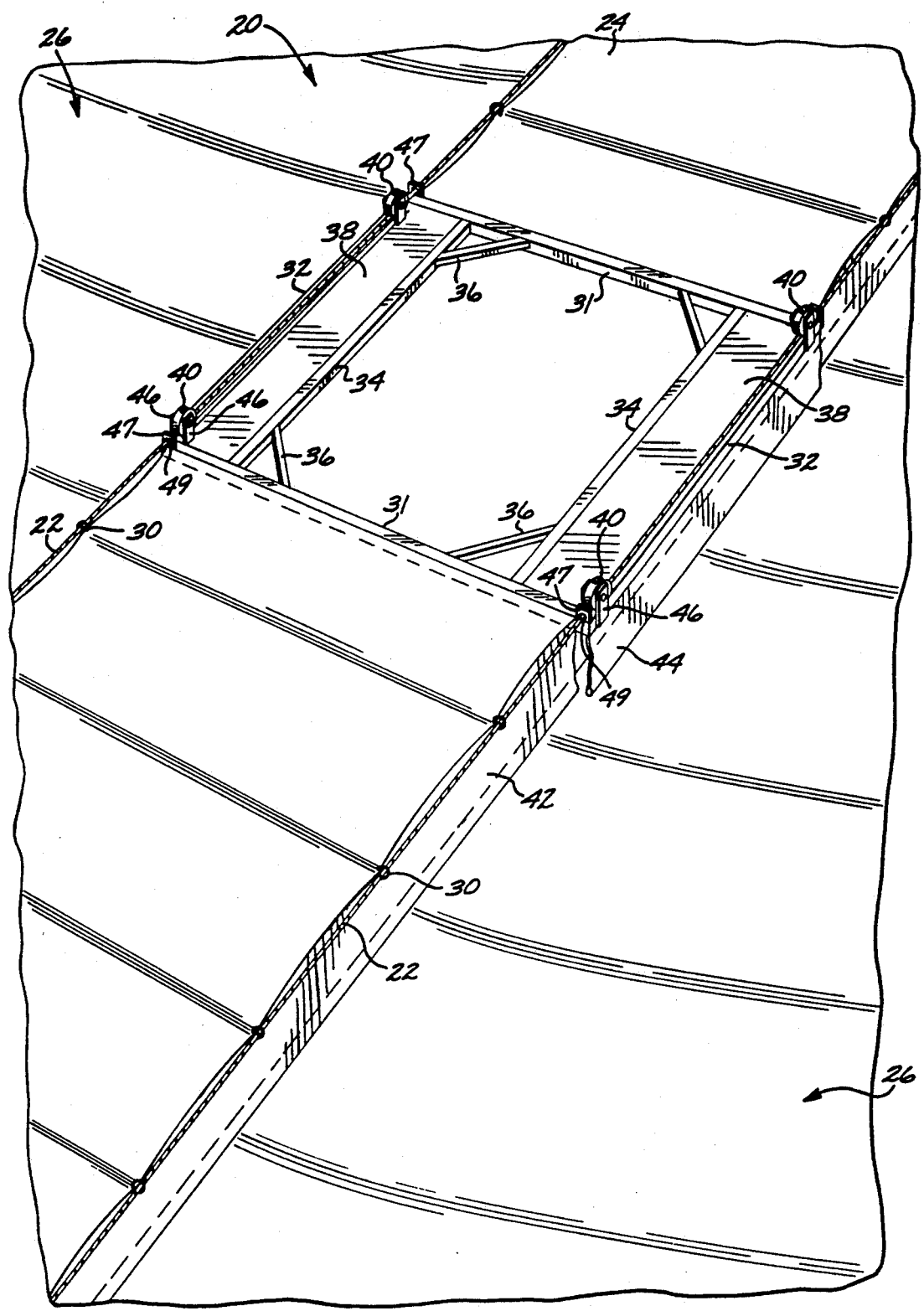
FIG. 3 is a greatly enlarged perspective view of a single frame of the present invention's dust control system.

FIG. 3 is a greatly enlarged perspective view of a single frame. The frame 20 generally consists of two longitudinal frame members 32 and two transverse frame members 31, extending along and between cables 22 respectively, to define a generally rectangular shape. Inner frame members 34 in conjunction with transverse frame members 31 define a square opening, while corner members 36 are diagonally disposed across each corner. Skirts 38 seal off the area between members 32 and 34. Bracket members 46 are attached at each corner of frame 20 and serve to support wheels 40. Plate 47 is positioned directly in front of each wheel assembly and has an aperture 49 therein to receive cable 22. Tarpaulins 24 are attached to transverse frame members 31 on either side of frame 20 while fixed tarp 26 is held taut below and slightly inboard of each cable pair 22. Weighted curtains 42 and 44 extend downwardly from the edges of tarps 24 and frame members 32 respectively to engage the tarp 26 in an abutting relation.

Figure 4:
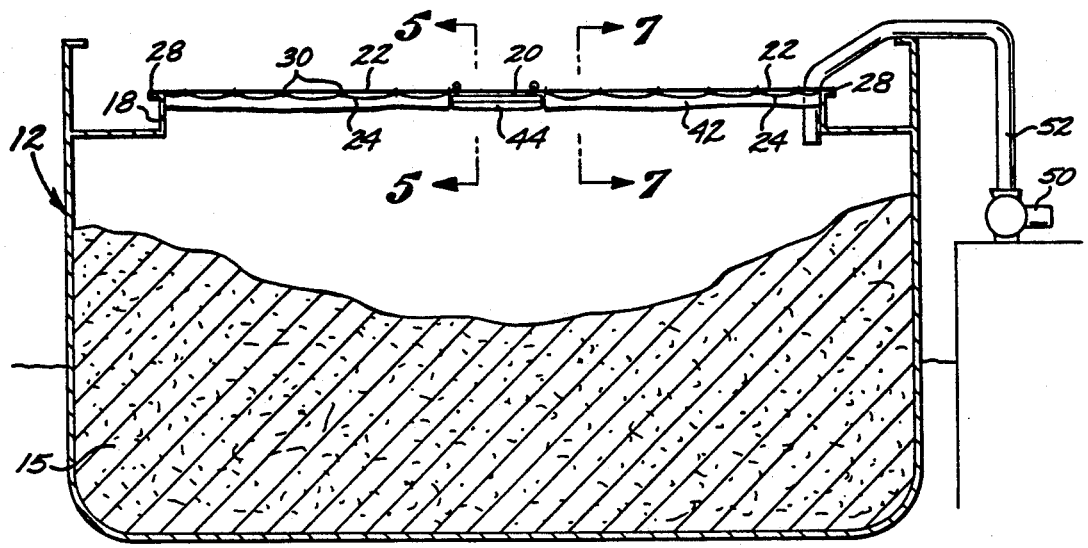
FIG. 4 is an enlarged cross-sectional view taken along lines 4—4 of FIG. 1.

FIG. 4 is a cross-sectional view illustrating one of frames 20 suspended over hold 18 above cargo 15. Clamping devices 28 attach the ends of cables 22 to the sides of hold 18. Curtains 42, 44 are clearly visible extending downwardly from tarps 24 and frame 20.

Figure 5:
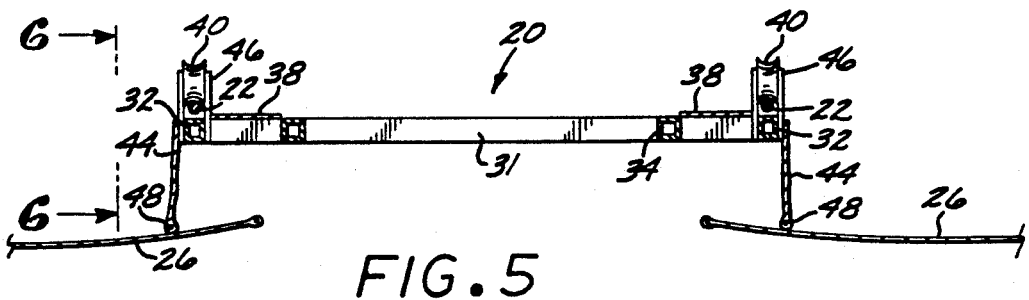
FIG. 5 is a further enlarged cross-sectional view taken along lines 5—5 of FIG. 4.

FIG. 5 is an enlarged cross-sectional view illustrating the frame's suspension on cables 22. Wheel 40 is formed with a depressed central radius in order to maintain its position above cable 22. The wheel support brackets 46 on either side of wheel 40 further prevent wheel 40 from disengaging cable 22. Curtains 44 extend downwardly from frame members 32 and are weighted with weights 48. The curtains 44 engage the tarps 26 therebelow in an abutting relation to form a seal.

Figure 6:
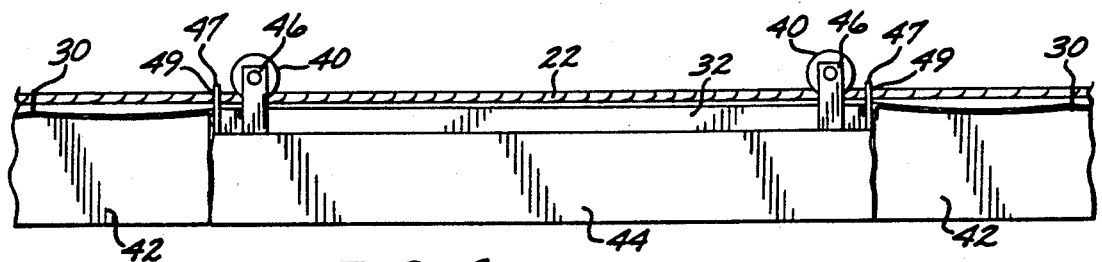
FIG. 6 is a cross-sectional view taken along lines of FIG. 5.

FIG. 6 more clearly shows the position of plates 47 extending upwardly in front of each wheel assembly. The plates 47 are intended to engage eyes 30 as frame 20 is pushed towards tarp 24. Apertures 49 allow cable 22 to pass through plate 47 and under wheels 40 between support brackets 46.

Figure 7:
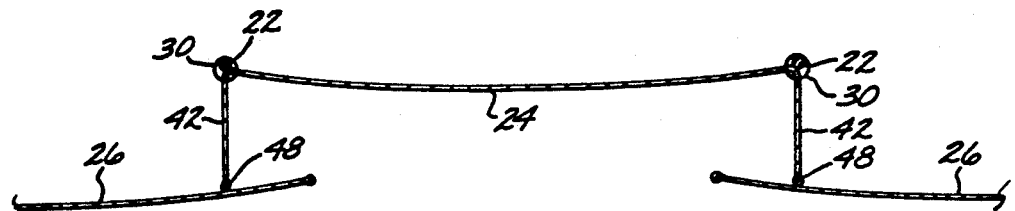
FIG. 7 is an enlarged cross-sectional view taken along lines 7—7 of FIG. 4.

FIG. 7 illustrates tarp 24 suspended between cables 22 by eyes 30. Excess material beyond the attachment points of eyes 30 form curtains 42 which engage the tarps 26 therebelow in an abutting relation in order to form a seal.

In operation, each frame is lifted into position while the cables 22 for supporting the frame are appropriately attached to the sides of hold 18 and tensioned. Cables supporting tarps 26 are similarly attached to the sides of 18 hold and tensioned. Each frame is fitted with a cover. The covered frames 20, tarps 24 and tarps 26 cooperating with curtains 42, 44 thereby serve to seal the entire hold. Dust collectors or blowers positioned inside the hold blowing outwardly or blowers 50 positioned outside the hold drawing air outwardly through ducting 52 serve to maintain a slightly negative pressure within the hold.

In order to commence the unloading operation, a cover 21 is removed from a frame 20 and the vertical conveyor 14 is inserted therethrough. The capacity of the dust collection blowers is selected such that sufficient negative pressure can be maintained despite leakage from between the various tarp interfaces and between the outer periphery of the vertical conveyor and the frame. The conveyor inserted through the frame can be angled for and aft and traversed across hold 18. Contact with frame 20 causes the frame to move accordingly wherein corner members 36 ensure a smooth action. Contact by plates 47 with eyes 30 causes tarp 24 to accordion as a frame 20 is pushed towards a side of hold 18 while preventing the excess material 24 from fouling the wheels 40. When the unloading operation calls for the relocation of the vertical conveyor 14, a second frame's cover is removed, the conveyor is reinserted through the newly opened frame and the cover over the previously accessed frame is replaced.

While a particular form of the invention has been illustrated and described, it will also be apparent to those skilled in the art that various modifications can be made without departing from the spirit and scope of the invention. Accordingly, it is not intended that the invention be limited except as by the appended claims.

What is claimed is:

1. A dust control system for preventing the escape of dust from a hold during bulk cargo handling operations, comprising:
    a hatch which forms an opening to the hold, the hatch having two oppositely disposed sides;
    a plurality of horizontally disposed rigid frames dimensioned to accommodate the insertion of a bulk cargo handling apparatus therethrough;
    means for independently suspending each of said rigid frames between said oppositely disposed sides of said hatch such that each frame is independently repositionable along a path, wherein each said path is defined by a respective one of said suspending means and wherein the paths of said frames are oriented so as to be parallel to one another in the plane of the hatch;
    first cover means extending between each frame and each of said oppositely disposed sides of said hatch, said first cover means being supported by said suspending means so as to allow each of said first cover means to accordion as said frames are repositioned toward said opposite sides; and
    second cover means for covering all other areas of said hatch not covered by said either of said first cover means or said frames.

2. The dust control system of claim 1 wherein each of said suspending means comprise a pair of cables tensioned between said sides of said hatch and said frames are supported on said cable pairs by wheels.

3. The dust control system of claim 2 wherein said first cover means comprise sections of flexible material, each section being attached to a frame and the respective side of the hatch and further engaging said cables on either side thereof via eye members that are securely affixed to the sides of said sections of material at spaced intervals and are freely translatable along said cables.

4. The dust control system of claim 3 wherein the sides of each section of flexible material has a weighted curtain extending downwardly therefrom to engage said second cover means in an abutting relation.

5. The dust control system of claim 4 wherein the sides of each frame parallel with said cables have a weighted curtain extending downwardly therefrom to engage said second cover means in an abutting relation.

6. The dust control system of claim wherein each of said frames describes a rectangular shape.

7. The dust control system of claim 6 wherein additional frame members are disposed within said rectangular shape to define a square opening therein and further comprising diagonal frame members near each corner of said square.

8. The dust control system of claim 7 wherein wheels are disposed above said frame for engaging said suspending means.

9. The dust control system of claim 8 wherein weighted curtains are attached to s id frame extending downwardly to engage said second cover means in an abutting relation.

* * * * *

UNITED STATES PATENT AND TRADEMARK OFFICE
CERTIFICATE OF CORRECTION

PATENT NO. : 5,322,405
DATED : June 21, 1994
INVENTOR(S) : Kennet Swensson et al It is certified that error appears in the above-identified patent and that said Letters Patent is hereby corrected as shown below:

In column 3, line 38, after "lines," insert 6-6.
 Column 6:
In Claim 6, line 26, after "claim," insert 1.
 Column 6:
In Claim 9, line 37, delete [s id], and replace with said.

Signed and Sealed this

Eleventh Day of October, 1994

Attest:

BRUCE LEHMAN

*Attesting Officer*    *Commissioner of Patents and Trademarks*